United States Patent [19]

Singer, Jr.

[11] 4,127,398
[45] Nov. 28, 1978

[54] MULTIPLE-CHANNEL TUBULAR DEVICES

[75] Inventor: Joseph Singer, Jr., Arlington Heights, Ill.

[73] Assignee: Ni-Tec, Inc., Skokie, Ill.

[21] Appl. No.: 482,327

[22] Filed: Aug. 20, 1965

Related U.S. Application Data

[63] Continuation-in-part of Ser. No. 310,971, Sep. 18, 1963, abandoned.

[51] Int. Cl.$^2$ ................................................. F16C 1/06
[52] U.S. Cl. ........................................ 65/4 A; 65/13; 156/296
[58] Field of Search ............................ 65/4, 13, 54, 55; 264/248, 96, 150, 151, 159, 209, 266, 265; 29/455 LM, 471.1; 156/296; 18/8

[56] References Cited

U.S. PATENT DOCUMENTS

| 487,419 | 12/1892 | Lee | 264/96 |
|---|---|---|---|
| 1,012,161 | 12/1911 | Roberts | 264/96 |
| 1,926,552 | 9/1933 | Morgan | 65/54 |
| 2,499,977 | 3/1950 | Scott | 29/423 |
| 2,608,722 | 9/1952 | Stuetzer | 65/4 |
| 2,619,438 | 11/1952 | Varian et al. | 29/423 |
| 2,748,401 | 6/1956 | Winstead | 264/209 |
| 2,752,731 | 7/1956 | Altosaar | 65/23 |
| 3,156,950 | 11/1964 | Walton | 18/8 |
| 3,224,851 | 12/1965 | Hicks | 65/4 |

Primary Examiner—Brooks H. Hunt
Attorney, Agent, or Firm—Cook, Wetzel & Egan, Ltd.

EXEMPLARY CLAIM

1. A process for forming a multiple-channel micro-tubular device comprising the following steps:
   assembling a plurality of individual tubes of heat deformable material into a closely packed array of a predetermined cross section;
   applying heat to said array to fuse said tubes into a unitary honeycomb structure;
   drawing said heated structure to reduce its cross section by at least an order of magnitude;
   cutting the drawn honeycomb structure into segments of a predetermined length and entrapping gas in each of the component tubes of said segments at a predetermined temperature below the fusion temperature of said material;
   packing a plurality of said segments together to form a cluster;
   and heating said cluster to a temperature above said predetermined temperature to fuse them into a unitary structure without collapsing said tubes.

11 Claims, 18 Drawing Figures

INVENTOR.
Joseph Singer
BY Jerry G. Wright
Atty.

MULTIPLE-CHANNEL TUBULAR DEVICES

The application is a continuation-in-part of an application of Joseph Singer, Jr., Ser. No. 310,971, filed Sept. 18, 1963, now abandoned.

This invention relates to devices comprised of a multiplicity of channels of small cross-sectional dimension and to processes for their manufacture. The invention is particularly, though not exclusively, applicable to electron multipliers and will therefore be primarily described in that connection. In addition, the invention is useful for producing collimators suitable for translating images formed of high energy radiation such as X-ray images. In some aspects, the invention is related to the field of fiber optic devices, the principal difference being that instead of using solid fibers for light transmission, hollow fiber tubes are utilized for electron multiplication or other purposes.

One known type of electron multiplier, termed a "channel multiplier," comprises an elongated cylindrical tube or channel having an interior surface which has a secondary emission capability and further having an excitation that establishes an electric field directed along the axis of the channel. In operation, an entering primary electron strikes the prepared interior surface of the channel and causes the release of one or more secondary electrons which are accelerated down the channel by the applied field, and these secondary electrons in turn impact the inner surface of the channel to release additional electrons. By this cascading action, effective multiplication of the original primary electron is achieved.

In the prior art, the technique of channel multiplication has been utilized primarily with relatively large diameter tubes and it has been suggested that a cluster of individual channels constituting a "channel plate" may be adapted to image translation. For example, such a channel plate may be incorporated in a cathode-ray tube to multiply the electrons of the scanning beam. It is apparent that in this application, the diameter of each individual channel determines the image resolution of the tube and a channel diameter of 4 to 5 millimeters would result in a resolution that is unacceptable for present day television display tubes. Techniques are required for the production of channel multipliers of more useful dimension for improved resolution.

The recent emergence of fiber optics with its accompanying production techniques has made possible the construction of clustered solid fibers individually of substantially microscopic size and efforts have been made to construct channel plates from them. One method of making a micro-tubular channel multiplier structure uses acid to etch out the inner core of each fiber of a fiber optic plate to produce a cluster of hollow channels. However, this method has several serious disadvantages such as the need for fibers with an inner core having a very low resistance to acid and an outer shield having a very high resistance to acid; the etching itself results in a tapered channel; each face of the fiber plate is roughened by the action of the acid attacking the edges of the ends of the channels; because of these inherent limitations of acid etching, the maximum obtainable length of the individual channels is limited, and the surface properties of the channels may be adversely affected. On the other hand if separate tubes are fastened together to form a multiple channel device, undesirable pockets or spaces may be formed within and between groups of tubes. These pockets reduce the hole to area ratio and when used in a channel multiplier structure may contribute noise or other undesirable effects.

Relatively large diameter multiple channel tubular devices which are unsuitable for use in television display tubes have been employed as collimators in nuclear medicine. In this field, scintillation cameras are used for visualizing radioisotope distribution in a particular part of the body and a collimator is a necessary accessory for many of these cameras. Most collimators presently known are of a lead or other metal tubular structure and are difficult to fabricate and expensive.

Accordingly, it is a major object of this invention to provide an improved multiple-channel tubular device and an improved process for manufacturing such a device.

It is another object of this invention to provide a micro-tubular channel multiplier which has uniform and precise channels.

It is yet another object of this invention to provide a method of making a multiple-channel tubular device which is economical and adaptable to large-scale commercial production.

It is still another object of the invention to provide a method of making a multiple-channel device which is free of pockets between the tubular elements thereof.

In accordance with the invention, a new and improved process for forming a multiple-channel micro-tubular device comprises the steps of producing a fused honeycomb array of hollow tubes, each tube being of substantially microscopic cross-section, and sealing the ends of the tubes at a temperature below the fusion temperature of the tubes in order to entrap gas within the tubes. A plurality of such honeycomb arrays may then be formed into a cluster and heated to the fusion temperature to fuse the cluster into a unitary structure without collapsing the individual tubes.

Yet another aspect of the invention concerns a process for forming a multiple channel tubular device which does not contain pockets between the tubular elements. This process includes the steps of assembling a plurality of individual tubes into a closely packed array of predetermined cross-section whereby the tubes are in tangent surface contact forming undesired pockets between adjacent tubes. The walls of the tubes are progressively expanded from one end of the array to the other end to eliminate the pockets.

The features of the present invention which are believed to be novel are set forth with particularity in the appended claims. The organization and manner of operation of the invention together with further objects and advantages thereof, may best be understood by reference to the following description taken in connection with the accompanying drawings, in the several figures of which like reference numerals identify like elements, and in which:

The principle of channel multiplication is already established and is discussed, for example, in an article entitled "Experiment with the Bendix Continuous-Channel Multiplier" by G. W. Goodrich and W. C. Wiley, Research Laboratories Div., The Bendix Corp., published in Image Intensifier Symposium, 24–26 October 1961, Fort Belvoir, Va., sponsored by: The National Aeronautics and Space Administration.

Figure 1:
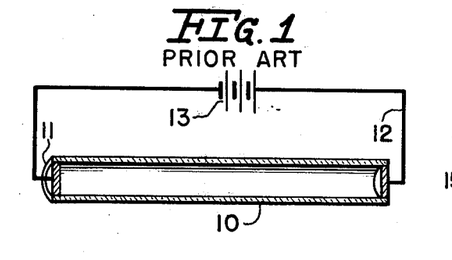
FIG. 1 is a schematic diagram partially in cross-section of a single channel multiplier tube known in the prior art.

Referring now to FIG. 1, the channel multiplying device there illustrated includes a long thin tube 10 having metalized ends 11, 12 with a uni-directional potential source, schematically indicated as a battery 13, connected between the ends to establish a uniform electric field in a direction parallel to the axis of the tube. The tube itself has an electrically conductive high-resistance coating on its inside surface which is in circuit with metalized ends 11, 12 and provides a uniform potential gradient along the axis of the tube.

Figure 2:
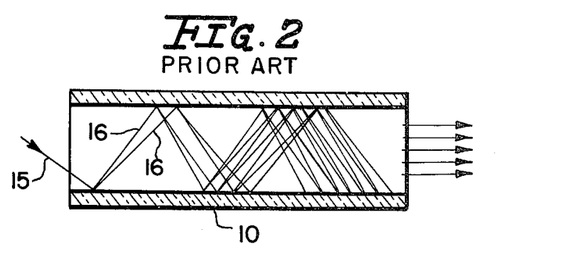
FIG. 2 is an enlarged view of the multiplier of FIG. 1 illustrating its operation.

FIG. 2 illustrates the principle of operation of the channel multiplier. A primary electron entering the tube along a trajectory 15 with sufficient transverse velocity collides with the wall of the tube and generates two or more secondary electrons as illustrated by the secondary electron paths 16. The electric field created along the direction of the longitudinal axis of the tube by battery 13 and end plates 11 and 12 accelerates these secondary electrons to the right as shown in the drawing and they again collide with the opposite wall of the channel to generate additional secondary electrons. Thus, a cascading or electron multiplying action is initiated which can produce electron gains in excess of $10^6$ times.

The electrically conductive inside coating of tube 10 is connected to electron source 13 which serves to replenish the liberated secondary electrons. One method of providing an appropriate coating within the tube is to construct the tube of a lead oxide-containing glass and then heat the glass tube in a reducing atmosphere of hydrogen which establishes a semi-conducting coating in a manner known in the art. The expression "semiconducting coating" is here used to denote a coating of high resistance and is not intended to connote any electron-hole phenomenon of semiconductor materials as found in the transistor art. Alternatively, the channel multiplier tube may be constructed of material having bulk conduction properties such that a uniform potential gradient is provided along the tube but in such a case the inside surface of the tube is to be coated with a material having secondary emission capability, such as magnesium oxide.

Figures 3, 4, 5, 9, 10, 11, 12:
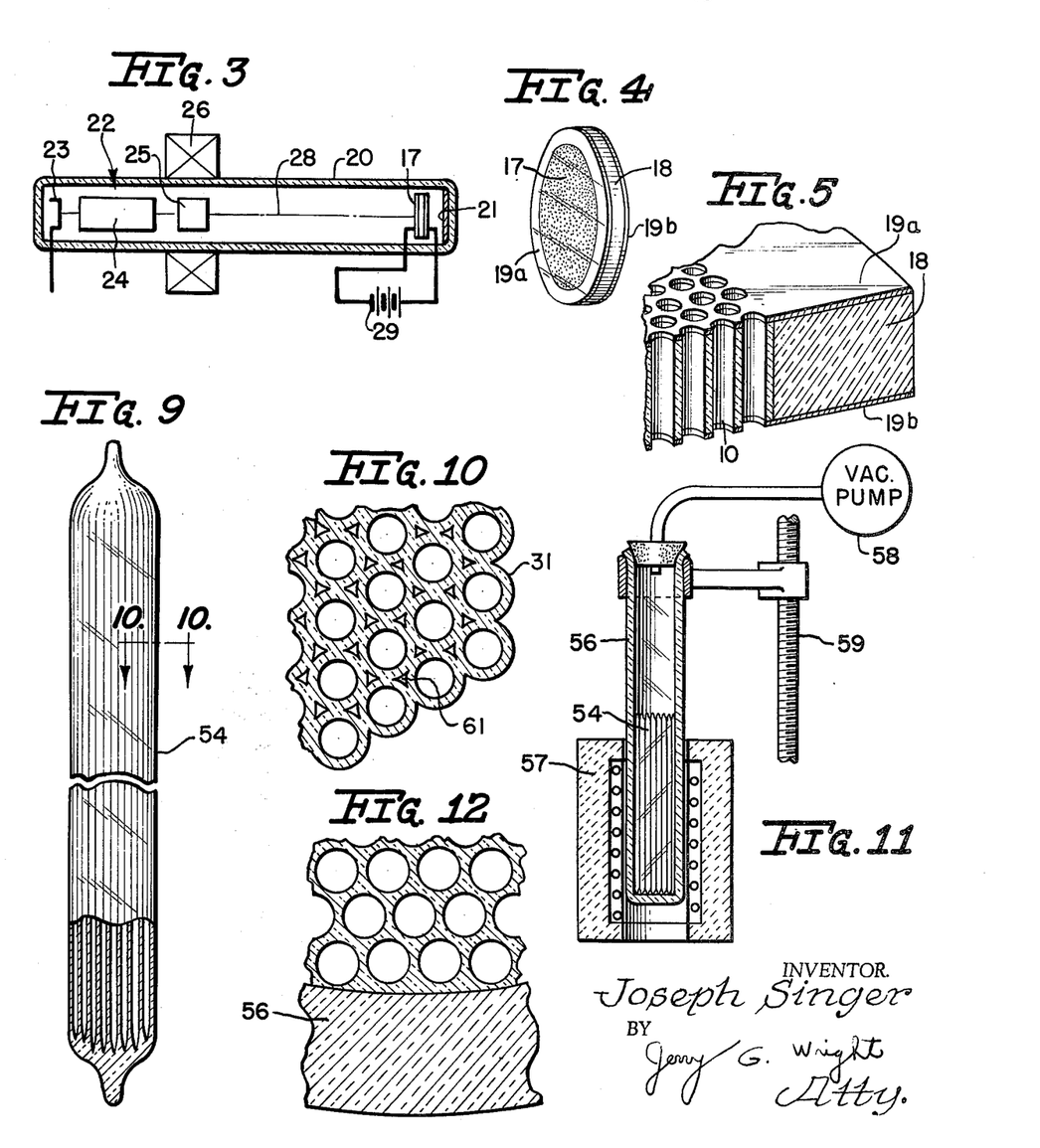
FIG. 3 is a schematic representation partially in cross-section of a cathode-ray tube embodying a channel multiplier plate of the present invention.
FIG. 4 is an enlarged perspective view of the channel multiplier plate utilized in FIG. 3.
FIG. 5 is an enlarged fragmentary perspective view, partly in cross-section, of the plate of FIG. 4.
FIG. 9 is an enlarged view, partially in section, of an intermediate structure produced by the apparatus of FIG. 6.
FIG. 10 is an enlarged cross-sectional view taken along lines 10—10 of FIG. 9.
FIG. 11 is a schematic representation of further production apparatus useful in producing multiple-channel micro-tubular devices embodying the invention.
FIG. 12 is an enlarged fragmentary cross-sectional view of the finished product produced by the apparatus of FIG. 11.

If several individual channel multiplier tubes are arranged in a mosaic plate, the plate may be utilized as an electron amplifier in cathode-ray tubes, image intensifiers and other image display tubes. FIGS. 4 and 5 illustrate the configuration of such a channel multiplier plate 17 constructed in accordance with the present invention and including a mosaic or cluster of microscopically small glass tubes 10, encompassed by a supporting ring 18 and provided with conductive coatings 19a and 19b, such as aluminum films, on opposite sides. Each of the component tubes is internally coated with a high-resistance or semi-conducting layer. The image resolution obtainable is dependent on the spacing between the individual channels; in general, the smaller the individual channels, the better the resolution. Processes for making channels of acceptably small internal dimension are described hereafter.

FIG. 3 illustrates the use of channel multiplier plate 17 in a cathode-ray tube. As shown, the tube comprises an evacuated glass envelope 20 having a phosphor coated display screen 21 at one end and an electron gun 22 and associated structure at the other end. The electron gun includes a cathode 23, a focusing anode 24 and an accelerating anode 25. Gun structure 22 produces an electron beam, as shown by dashed line 28, which is scanned by a deflection yoke 26 over the face of screen 21 to produce a light output. Channel multiplier 17 is located in the beam path adjacent screen 21 and amplifies the scanning electron beam 28. Plate 17 is dimensioned so that the beam impinges thereon during the entire scanning raster. A suitable power supply, schematically represented as a battery 29, provides the excitation required to establish the longitudinal electric field of the plate. Except for channel multiplier plate 17, the cathode-ray tube may be of any conventional construction such as that used in oscilloscopes and in television receivers.

It has been found that the ratio of length to internal diameter of the individual channels of the multiplier plate has a predetermined optimum for a given excitation potential. The considerations involved concern the electrical properties and characteristics of the channel multiplier material. Indeed, the properties of the material limit the maximum voltage which can be sustained before breakdown occurs and in addition the magnitude of the applied voltage limits the useful length of the multiplier tubes since as the length increases there is a tendency toward space charge buildup within the tube which suppresses further multiplication of electrons. The maximum useful length is the length attained before space charge buildup is experienced. For a multiplier constructed of glass of the lead borate type, electron multiplication of as much as 300 times has been produced with a ratio of length to diameter of 60, obtained with a plate having a thickness of one hundred twenty thousandths of an inch (0.120 inch), an individual channel diameter of two thousandths of an inch (0.002 inch), and a potential across the plate of 2000 volts.

The advantages of a channel multiplier plate in a cathode-ray tube are self evident. In particular, the brightness of output screen 21 may be significantly improved by the electron multiplication. Moreover, the operating potential of screen 21 for a given brightness level may be substantially reduced. This makes possible the use of lower driving power for the deflection yoke which is a definite advantage especially for battery-operated portable television receivers.

The channel multiplier plate 17, as illustrated in FIG. 3, is in juxtaposed relation to and must be nearly equal in size to the image screen of the picture tube. Alternatively, it may be incorporated in gun structure 22 to reduce the electron availability requirements of the cathode 23, or to provide greater beam current from a cathode of given emissivity. In such a case, the multiplier plate is on the cathode side of the center of deflection of the tube and it may, therefore, be of greatly reduced physical size, having a cross section no larger than that of the gun electrodes.

Figure 6:
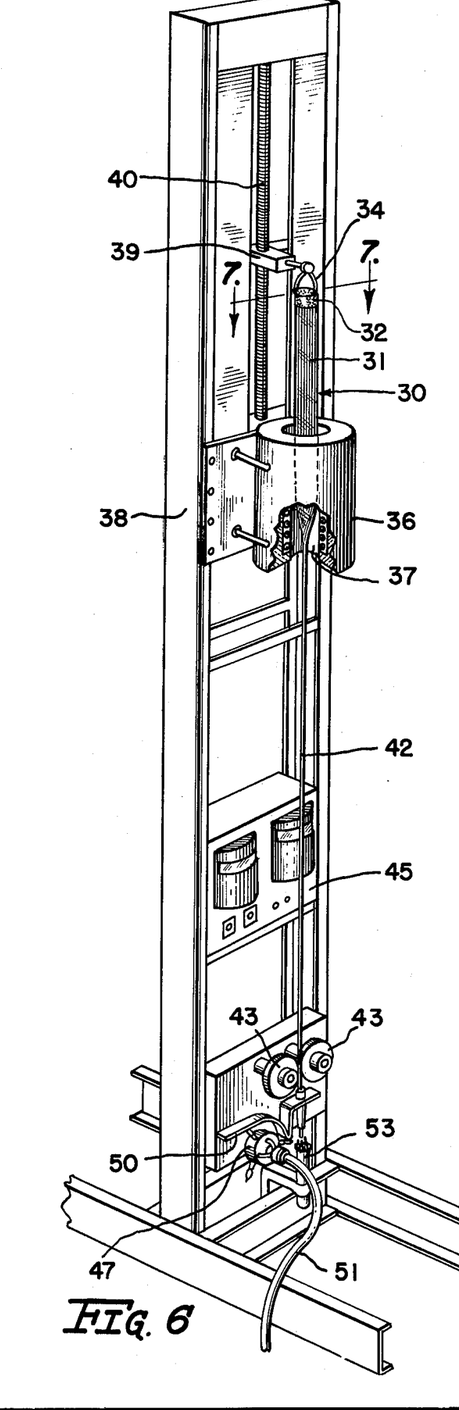
FIG. 6 is a perspective view, partly schematic, of an apparatus for producing multiple-channel micro-tubular devices in accordance with the present invention.
Figure 7:
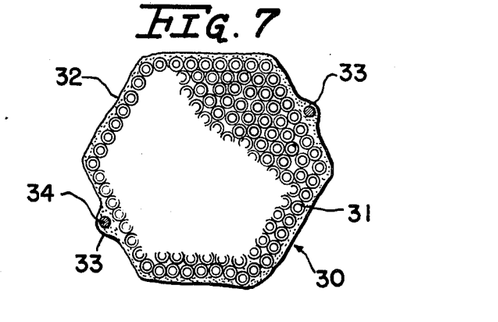
FIG. 7 is an elevational view taken along lines 7—7 of FIG. 6, illustrating the raw material used in the novel process.

The present invention provides novel methods of manufacturing a channel multiplier plate. FIG. 6 illustrates a machine for performing an essential part of the process. Initially, a plurality of individual tubes 31 of lead borate glass or other suitable heat-deformable and fusible material are packed into a honeycomb array 30 of predetermined cross-section which, as indicated in FIG. 7, is preferably hexagonal. The plurality of tubes 31 are retained in a desired array by an encompassing rim 32, of metal or other supporting material, which includes outwardly extending tabs 33 engaged by a wire hanger 34. This starting arrangement of tubes or channels 31 is referred to as a "macro boule."

The macro boule is processed in an oven 36 having a vertically oriented cylindrical interior 37 and attached to a support frame 38. The macro boule 30 is suspended into oven 36 by means of a carriage 39 which retains wire hanger 34. The carriage is mounted on a vertical screw 40 which is journaled in frame 38 to be driven by a suitable variable-speed motor (not shown). Carriage 39 is restrained against rotation so that rotation of screw 40 is translated into up or down displacement of the carriage. The frame is approximately 30 feet in height.

Figure 8:
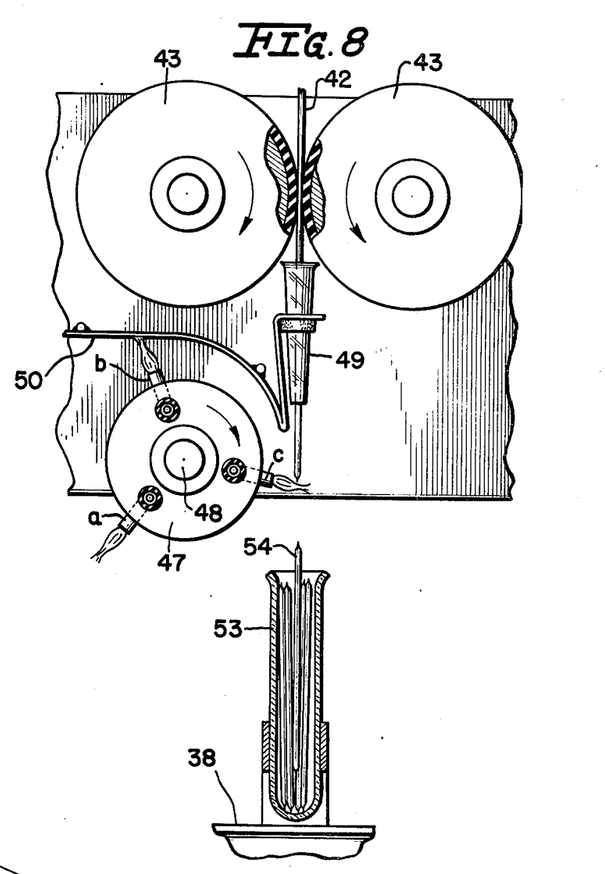
FIG. 8 is an enlarged detail view of a portion of the apparatus of FIG. 6.

To process macro boule 30, furnace 36 is initially brought to a temperature which exceeds the softening temperature of the material of tubes 31 so that a glob forms at the lower end of the macro boule. This glob is drawn manually or under the influence of its own weight into a thin thread 42 which is then threaded between drawing wheels 43 which frictionally engage it as best shown in FIG. 8. Wheels 43 are driven in opposite directions by a variable speed motor (not shown). After the drawing wheels have been threaded and the temperature of oven 36 has been reduced to the softening temperature of the material being worked, the drawing process is carried out. The drawing process is similar to that utilized in drawing fiber optic bundles of fiber elements having a solid inner core but differs in that the heating temperature must be carefully adjusted to prevent collapse of the individual tubes. Techniques generally similar to those employed in drawing individual capillary tubes may be employed. By way of example, the following is a description of a typical draw:

An original array of macro boule 30 of a number of individual glass tubes of industry type designation EG.3 as supplied by Kimble Glass Company, was cemented in a hexagonal shape. Each individual tube had an outer diameter of 5 millimeters and an inner diameter of 3 millimeters. The glass bundle was 2 feet long and a terminal portion 5 inches in length was suspended in a combustion-type tube furnace 36 manufactured by the Hevi-Duty Electric Company, type M-5018 having a 5000 watt rated capacity. The softening temperature of the glass is 600° C. and an initial oven temperature of approximately 630° C. was maintained until a glass glob formed at the lower end of the tube bundle and started to descend from the oven. This glass glob was manually drawn and threaded into drawing wheels 43. Thereafter, the oven temperature was reduced and the charge permitted to cool to a drawing temperature of about 600° C. The proper temperature was attained in about 20 minutes and the drives for screw 39 and wheels 43 were energized. The drawing speed of rollers 43 was set to ten feet per minute and the feeding speed of the macro boule into oven 36 was set at the rate of approximately 1 inch per hour. These speeds are determined by the amount of draw desired. For the illustrative case, the original face to face dimension was 4.5 inches and the drawn dimension was 50–60 mils.

By the above process step, the individual tubes 31 are fused into a unitary honeycomb structure or micro bundle 42 by the application of heat and are drawn down to a cross section at least an order of magnitude smaller than the original cross section of the array. Precise control of heat and drawing speeds prevents collapse of the individual tubes which retain their original cross sectional configuration. In particular, they remain cylindrical albeit with a reduced diameter. The final cross sectional dimension of micro bundle 42 is related to the original cross sectional dimension of macro boule 30, the speed at which it is fed into the oven, and the drawing speeds.

Micro bundle 42 is cut into predetermined lengths and sealed at the same time by a cutting flame which is positioned in relation to drawing wheels 43 as best shown in FIG. 8. A flame wheel 47 is mounted on a shaft 48 which is driven with and rotates at the same speed as wheels 43. Mounted on the periphery of wheel 47 are three gas jets $a$, $b$, $c$ for individually producing a cutting flame which has a circumferential velocity equal to that of wheels 43; in other words, the tip of each flame is at the same radius from its center of rotation as the peripheries of wheels 43. The micro bundle or multiple 42 is guided through a flame by a structure 49 mounted on a heat shield 50 which prevents premature application of the flame to bundle 42. Gas is supplied to flame jets 47 $a$–$c$ by means of a flexible supply hose 51, best seen in FIG. 6, which is connected to a rotary coupling journaled on shaft 48. A receptacle 53 is mounted on frame 38 to receive and retain the segments cut from micro bundle 42.

In operation, flames 47 $a$, $b$ and $c$ sever successive segments of micro bundle 42 as it moves past heat shield 50. Since the tip or cutting portion of the flame moves at the same linear speed as the bundle, the bundle remains in the flame a sufficient time to be completely severed and its ends sealed. The length of each segment 54 may be varied by altering the number of flame jets on wheel 47 or the radial location of the jets.

In accordance with the invention, the air which is contained in the individual hollow tubes 31 is entrapped during the cutting process by the action of the flame sealing the ends of the glass threads. One severed segment 54 of the micro bundle is shown enlarged in FIG. 9 with a cut away portion illustrating the individual channels 31 which remain in the segment and retain the entrapped air. The cross sectional view of FIG. 10 shows how the original glass tubes 31 have been fused to one another to form unitary honeycomb structure 42. The internal diameter of each tube of FIG. 10 is approximately 2 mils as compared to the original internal diameter of approximately ⅛ inch. Tubes 31 are fused to each other at spaced portions of their peripheries since the tubes have an initial tangent contact within the macro boule structure. With this type of fusion, triangular pockets 61 may be formed in the segment and, of course, they would also contain entrapped air. The air entrapped in the component tubes of micro bundle segment 54 is at approximately ambient room temperature, or at least is substantially below the fusion temperature of the glass, since the distance of travel from oven 36 to drawing wheels 43 allows the tube itself and the air within it to cool substantially before sealing by flame jets 47.

After a plurality of micro bundle segments 54 have been formed in the manner described, they are packed into a heat deformable receptacle 56 (FIG. 11) such as glass having a coefficient of expansion substantially matching the coefficient of expansion of the individual tubes of the bundles. Receptacle 56 is inserted into a ring-like termination of a clamp arm 56a which at its opposite end has a threaded bushing for cooperating with a rotatable screw 59. Arm 56a is restrained against rotation so that rotation of screw 59 displaces receptacle 56 vertically in relation to oven 57. The receptacle is loaded into clamp arm 56a with the arm well above oven 57 so that rotation of screw 59 lowers receptacle 56 into oven 57 at a predetermined rate. The upper end of the receptacle is suitably sealed and connects with an exhaust system to be at least partially evacuated by means of a vacuum pump 58. Receptacle 56 and bundle segments 54 contained therein are heated to approximately their softening or fusion temperature allowing the vacuum to cause the walls of the receptacle to draw inwardly, which tends to press segments 54 together. However, air which has been entrapped in the individually sealed tubes of each bundle segment builds up a counter-pressure which prevents the collapse of the component tubes during the fusing process of receptacle 56. Alternatively, receptacle 56 may be constructed to be relatively non-deformable at the fusion or melting temperature of the glass and in that case the application of heat increases the pressure of the gas entrapped in the component tubes causing them to expand slightly and fuse together. In any case, it is desirable that receptacle 56 have a coefficient of expansion similar to that of the individual tubes so that upon cooling the entire structure, stresses and attendant cracking will be avoided.

FIG. 12 illustrates an idealized form of the final product from furnace 57 of FIG. 11. The wall of receptacle 56 is fused to a plurality of segments 54 which themselves have fused together to eliminate the pockets or separations 61 between adjacent tubes illustrated in FIG. 10.

There are a number of ways for eliminating pockets 61. For example, while the macro boule is in the form shown in FIG. 7, soft glass cores may be inserted in the spaces between individual tubes 31. These soft cores are drawn into micro bundle 42 and reduced in size in the same manner and at the same time as the individual tubes 31, completely filling all of the pockets 61. This has the advantage of adding mechanical strength to the micro bundle but at some sacrifice in the hole to area ratio.

In some applications, the device may be used in the form illustrated in FIG. 10, without elimination of the pockets 61.

Figure 13:
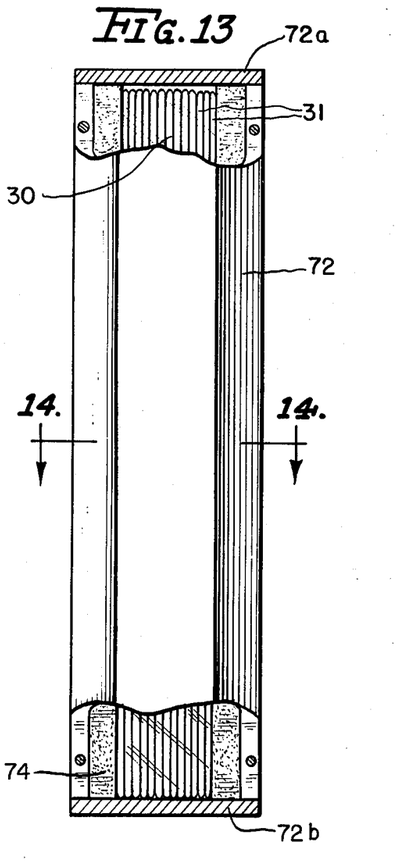
FIG. 13 is a perspective view of another apparatus for producing multiple-channel tubular devices in accordance with the invention.

Another method of removing pockets 61 involves preprocessing of the macro boule before the drawing process is undertaken. More particularly, a plurality of individual tubes 31 are assembled into a closely packed array or macro boule 30 of hexagonal cross section as shown in FIG. 13 and placed in a retainer or mold 72 which comprises a stainless steel sheath lined with carbon slabs 74. It is required that the mold be easily detachable from the glass; in other words, the glass must not in any way fuse to the walls of the mold. Finally, it is necessary that steel sheath be easily disassembled because there is otherwise a danger that during cooling the sheath may contract at a rapid rate compared with the liner and channel tubes which can easily result in breaking of the macro boule. This requirement is readily met by having the sheath sectionalized with adjoining sections releasably locked together by knockout pins which may be knocked out of position when it is desirable to disassemble the sheath. The ends of the sheath are likewise closed by caps 72a and 72b releasably retained in position by knockout plugs or pins.

Preliminarily, both ends of each of tubes 31 are sealed to entrap air within them. This is preferably done at room temperature, but in any event at a temperature below the fusion temperature of the glass, since the rise in pressure of the entrapped air will be utilized later in eliminating pockets 61. After tubes 31 have been sealed, they are carefully packed to fill mold 72 which will have had its sheath releasably assembled. The physical arrangement, with tubes 31 in tangent contact giving rise to pockets 61, is shown in FIG. 14a. Caps 72a, b are placed in position and the charged mold is now ready for heat treating.

Figure 14:
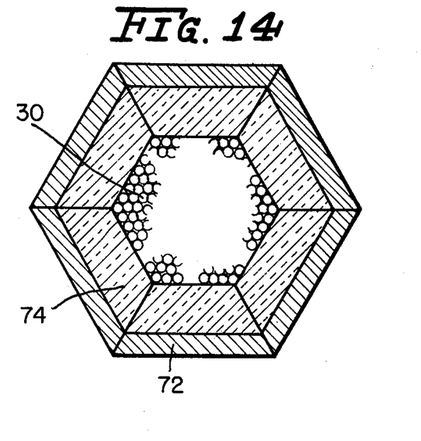
FIG. 14 is a cross-sectional view taken on section line 14—14 of FIG. 13.
Figure 14A:
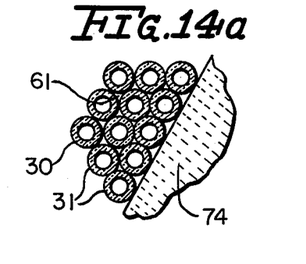
FIGS. 14a and b are fragmentary views of micro-tubular structures in different processing stages.

A suitable oven 76 is shown in FIG. 14. It is of the electric type with a rectangular outer shell and a cylindrical interior 77 with several vertical "calrod" electric heater elements 79 serving as a source of heat. The oven also has a base 80 upon which the upper rectangular shell may be lowered by a pulley system (not shown). A pressurized air line 81 is provided, terminating in an air injection nozzle 81 to maintain a limited amount of air circulation in the furnace and to avoid extreme temperature variations in the interior.

Mold 72, charged with sealed tubes 31 as previously described, is placed upon base 80 and the oven shell is lowered over it as indicated in FIG. 13. The oven is now brought up to a temperature approximately equal to the softening temperature of the glass of the macro boule. As a consequence, the glass softens and the entrapped air, which will have experienced an increase in temperature, expands the softened glass of the individual tubes 31 to close pockets 61. They close progressively from top to bottom and force out any air that had been enclosed within the pockets rather than closing in a fashion that would seal air pockets into the macro boule. This will be understood from a consideration of the temperature gradient within the oven.

The oven is constructed to be hotter at the top than at the bottom, establishing a heat gradient of perhaps 20° C. within it. As the oven heats, a softening temperature is first encountered at the top of the oven and at the top portion of the macro boule. As a consequence, the top portion of the macro boule softens first and the air within the sealed tubes 31 exerts a pressure which causes expansion of the top part of the tubes and closing of the top portion of pockets 61. As the oven temperature increases, the softening temperature level is experienced at constantly decreasing heights within the oven. This may be expressed as movement of the softening-temperature level vertically downward within the oven. At each successive level, the corresponding portion of the macro boule softens so pockets 61 are closed from top to bottom. In this manner the air is driven from pockets 61 as they are closed and irregularities in the fused macro boule are avoided. This is a distinct advantage because such irregularities in a channel multiplier plate would be observable as black spots in an image display.

Figure 14B:
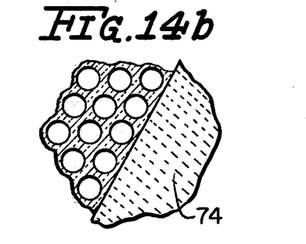
Figure 15:
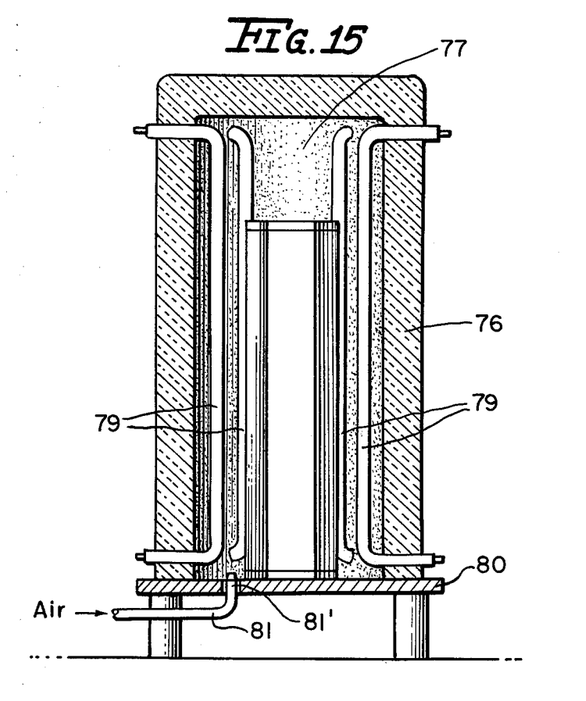
FIG. 15 is a sectional view of a further apparatus useful in practicing the invention.

Expansion of tubes 10 to eliminate pockets 61 causes the macro boule to take on the hexagonal shape of mold 72 as indicated in FIG. 14b. The hexagonal configuration of the mold itself is ideal since hexagonal peripheries mesh together perfectly. A square mold is theoretically possible but requires critical control of heat for even distribution throughout the assembly. Thus from a practical point of view the hexagonal configuration is most acceptable. After pockets 61 have been eliminated and while mold 72 remains within oven 76 the knockout pins are removed from the sheath and end caps to disassemble the mold for cooling. This may easily be accomplished by one or more access doors (not shown) of the oven. Thereafter carbon lines 74 are removed and the fused macro boule 30 is ready for drawing in the apparatus of FIG. 6.

The following is an example of processing times and temperatures for a specific composition of glass tubes 31 which provided exemplary results:

Four hundred and sixty-nine glass tubes of the potash lead type supplied by Corning Glass Company under designation Glass Code 8161 were placed in mold 72. Each tube had an inner diameter of 3/32 of an inch and an outer diameter of ⅛ of an inch. Mold 72 was two feet long and the face to face distance of the inner hexagonal array was 2-⅝ inches. Carbon liners 74 had a thickness of one inch and the stainless steel sheath a thickness of ½ inch. The packed mold was placed into the oven and the average temperature raised to 490° C. The air circulation was adjusted with compressed air from tube 81. A 20° temperature difference was measured between the top of the mold and the bottom. After 5 hours of heating the temperature difference was 10° C. This is believed to be due to the heat retaining qualities of the carbon and stainless steel of the mold which tends to minimize the temperature gradient. The 490° C. average temperature was maintained for 16 to 18 hours at which time the mold was disassembled and the macro boule allowed to cool to room temperature.

The softening point of the glass used in the above example was 600° C. which is higher than the average oven temperature. Although the elimination of pockets 61 has been explained above on the basis of an oven temperature approximately equal to the softening temperature, essentially the same result may be attained by exposure of the glass to a somewhat lower temperature for a relatively long period of time. Thus fusing of one tube to another may be accomplished over a wide temperature range so long as the processing time is properly correlated to the operating temperature.

After the processing of the tubular array 70 it can be further processed to produce a micro-tubular array in the same manner as described above in conjunction with array 30, starting with placing the array in the furnace of FIG. 6 and drawing it. At least one end, preferably the top end, of each of the tubes of the fused array must be opened before the drawing operation to allow for the escape of air during the resultant reduction in diameter of the array.

In the drawing process the fused array retains its hexagonal configuration which makes possible a high packing density in the final step of FIG. 11. The resultant channel plate made by the above process has a high hole-area ratio with almost no undesirable pockets between individual channels or channel groups.

Figure 16:
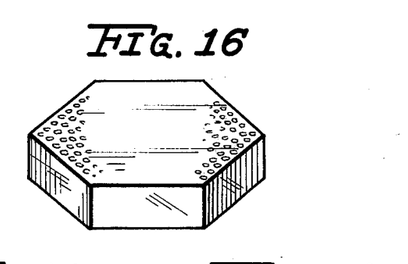
FIG. 16 is a perspective view of a multiple channel tubular device produced by the apparatus of FIGS. 13 and 15.

The fused array from mold 72 may be used without further extensive processing as a collimator or similar device. After being removed from the mold a slice of convenient thickness, illustrated in FIG. 16, may be cut from the fused array and used as a collimator for a scintillation camera. The lead content of the glass provides sufficient shielding between channels or, alternatively, the tubes may be further processed to coat their interiors with a dense metal.

If it is assumed that the fused macro boule is to be further processed to make a micro boule, a number of them are assembled in receptacle 56 and fused in the apparatus of FIG. 11, as previously described. After the micro boule from oven 57 has been cooled, a disk type glass cutter is utilized to slice the unitary structure into pancake-like wafers for use as channel plates. As discussed above, a channel plate when used for electron multiplication must be electrically conductive in order that a uniform potential gradient may be produced along its length and, in addition, the internal surface of each tube must have a secondary emission ratio greater than unity. For channels made of lead borate glass of the EG3 type discussed above, the glass itself fulfills the secondary emission requirement and known processes, such as firing in a hydrogen atmosphere to yield a semiconducting lead-containing coating on the internal surfaces, may be employed to satisfy the electrical conductivity requirements. Metal conductive coatings 19a and 19b are thereafter applied, as by the evaporation of aluminum metal, to form the finished channel multiplier plate of FIGS. 4 and 5. The surrounding glass ring 18, in addition to acting as a rigid support for the relatively fragile channel multiplier structure, facilitates the application of electrical contacts.

The final channel multiplier structure is a definite improvement over the prior art in that the channels are of uniform dimension throughout their entire length and do not individually vary in cross section.

As illustrated in FIG. 5 the cross section configuration is round; however a hexagonal configuration is also satisfactory from an electrical standpoint and superior with regard to the hole-area ratio. In contrast, the acid etching process of the prior art results in a tapered channel with a roughened end plate surface.

Thus, the present invention provides an economical method of manufacturing multiple-channel micro-tubular devices which is adaptable to large-scale production techniques while yielding a product of superior quality. Limitations on the length or overall configuration such as those imposed by the use of selective acid etching are avoided. Moreover, the present invention provides an economical method of making multiple-channel macro-tubular or micro-tubular devices which have no pockets between tubes.

In addition to the preferred use of the present invention in the fabrication of channel multiplier plates and collimators for medical uses, several other applications of the inventive process are apparent. For example, a plate having a cluster of microscopic size tubes may be used as a spray nozzle, a filter, or as a thermal diffusion fractionator. The metallic electrodes and internal conductive coatings may be omitted, or the particular overall configuration of the micro-tubular device and its supporting structure may be modified to suit the particular application, without departing from the invention.

While particular embodiments of the present invention have been shown and described, it is apparent that various changes and modifications may be made, and it is therefore intended in the following claims to cover all such modifications and changes as may fall within the true spirit and scope of this invention.

I claim:

1. A process for forming a multiple-channel micro-tubular device comprising the following steps:
    assembling a plurality of individual tubes of heat deformable material into a closely packed array of a predetermined cross section;
    applying heat to said array to fuse said tubes into a unitary honeycomb structure;
    drawing said heated structure to reduce its cross section by at least an order of magnitude;
    cutting the drawn honeycomb structure into segments of a predetermined length and entrapping gas in each of the component tubes of said segments at a predetermined temperature below the fusion temperature of said material;
    packing a plurality of said segments together to form a cluster;
    and heating said cluster to a temperature above said predetermined temperature to fuse them into a unitary structure without collapsing said tubes.

2. A process for forming a multiple-channel micro-tubular device comprising the following steps:
    assembling a plurality of individual tubes of heat deformable material having a predetermined thermal coefficient of expansion into a closely packed array of a predetermined cross section;
    applying heat to said array to fuse said tubes into a unitary honeycomb structure;
    drawing said heated structure to reduce its cross section by at least an order of magnitude;
    cutting the drawn honeycomb structure into segments of a predetermined length and entrapping gas in each of the component tubes of said segments at a predetermined temperature below the fusion temperature of said material;
    inserting a plurality of said segments into a heat deformable receptacle having a coefficient of expansion substantially matching said predetermined coefficient to form a closely packed cluster;
    sealing said receptacle to form a vacuum-tight enclosure;
    at least partially evacuating said sealed receptacle;
    and heating said receptacle to a temperature above said predetermined temperature to fuse said cluster into a unitary structure, the atmospheric pressure external to said receptacle tending to compress it and the individual segments together, and the gas trapped in the individual heat deformable tubes building up a counter pressure due to the application of heat to inhibit collapse of the tubes during the fusing process.

3. A process for forming a multiple-channel micro-tubular device comprising the following steps:
    assembling a plurality of individual heat deformable tubes into a closely packed array of a predetermined cross section;
    applying heat to said array to fuse said tubes into a unitary honeycomb structure;
    drawing from said heated honeycomb structure at a predetermined velocity a continuous micro bundle of a corresponding plurality of tubular elements individually having a cross section at least an order of magnitude smaller than said cross section of said tubes of said honeycomb structure;
    applying a flame to said bundle for severing it into segments and concurrently sealing the severed ends of each element of said segment to entrap gas in such elements;
    packing a plurality of said segments together;
    and heating said packed plurality of segments to fuse them into a unitary structure without collapsing said elements.

4. A process according to claim 3 comprising the additional step of moving said flame with a velocity component parallel to said bundle substantially equal to said predetermined velocity during the severing and sealing operation.

5. A process for forming a multiple-channel micro-tubular device comprising the following steps:
    assembling a plurality of individual heat deformable tubes into a closely packed array of a predetermined cross section;
    applying heat to said array to fuse said tubes into a unitary honeycomb structure;
    drawing from said heated honeycomb structure at a predetermined velocity a continuous thin micro bundle of a corresponding plurality of tubular elements individually having a cross section at least an order of magnitude smaller than said cross section of said honeycomb structure;
    applying a flame to said bundle to sever it into segments and concurrently sealing the severed ends of each element of said segment to entrap gas in such elements;
    packing a plurality of said segments together to form a cluster;
    heating said cluster to fuse it into a unitary structure without collapsing said component tubes;
    and cutting said unitary structure into slices having a predetermined thickness.

6. A process of manufacturing a channel multiplier plate for use in an image display device or the like, comprising the following steps:
    assembling a plurality of individual heat deformable tubes into a closely packed array of a predetermined cross section;
    applying heat to said array to fuse said tubes into a unitary honeycomb structure;
    drawing from said heated honeycomb structure at a predetermined velocity a continuous thin micro bundle of a corresponding plurality of tubular elements individually having a cross section at least an order of magnitude smaller than said cross section of said honeycomb structure;
    applying a flame to said bundle to sever it into segments and concurrently sealing the severed ends of each element of said segment to entrap gas in such elements;

packing a plurality of said segments together to form a cluster;

heating said cluster to fuse it into a unitary structure without collapsing said component tubes;

cutting said unitary structure into slices having a predetermined thickness;

and coating the faces of said slices with electrically conductive material.

7. A process according to claim 1 in which said individual tubes are sealed at their ends to entrap gas therein and said heat is applied to said array to produce a temperature difference between one end of such array and the other end.

8. A process for forming a multiple-channel tubular device comprising the following steps:

assembling a plurality of individual tubes of heat deformable material into a closely packed array of predetermined cross section with said tubes in tangent surface contact having undesired pockets between adjacent tubes, said tubes having both ends sealed with entrapped gas therein;

and heating said array to establish a temperature difference between one end of said array and the other end, and continuing the application of heat to said array while maintaining said predetermined cross section of said array, to progressively fuse said array from said one end to the other end into a unitary structure to eliminate said pockets between said tubes.

9. A process for forming a multiple-channel tubular device comprising the following steps:

assembling a plurality of individual tubes of heat deformable material into a closely packed array of predetermined cross section with said tubes are in tangent surface contact having undesired pockets between adjacent tubes, said tubes having both ends sealed to entrap therein gas at a predetermined temperature;

heating said array to a temperature that is high relative to said predetermined temperature to establish a temperature difference between one end of said array and the other end;

and continuing the application of heat to said array, while maintaining said predetermined cross section of said array, to progressively fuse said array from said one end to the other end into a unitary structure to eliminate said pockets between said tubes.

10. A process for forming a multiple-channel tubular device comprising the following steps:

assembling a plurality of individual tubes of heat deformable material into a closely packed array of predetermined cross section with said tubes in tangent surface contact having undesired pockets between adjacent tubes;

sealing both ends of each of said tubes at a given temperature to entrap gas therein;

heating said array, while maintaining said predetermined cross section of said array, to a temperature that is high relative to said given temperature and at which said material is easily deformable but below the melting temperature of said material and producing a temperature difference between the ends of said array;

maintaining the application of heat to said array to progressively fuse said tubes together from the hotter to the cooler end of said array to eliminate said pockets.

11. A process for forming a multiple-channel microtubular device comprising the following steps:

assembling a plurality of individual tubes of heat deformable material into a closely packed array of predetermined cross section with said tubes are in tangent surface contact having undesired pockets between adjacent tubes, said tubes having both ends sealed to entrap gas at a given temperature;

heating said array, while maintaining said predetermined cross section of said array, to a temperature that is high relative to said given temperature and at which said material is easily deformable but below the melting temperature of said material and producing a temperature difference between the ends of said array;

continuing the application of heat to said array to progressively fuse said tubes together from the hotter to the cooler end of said array to eliminate said pockets;

opening at least one end of each of said tubes;

and then drawing said fused array to reduce its cross section by at least an order of magnitude.

* * * * *